United States Patent
Knoll et al.

(10) Patent No.: US 7,391,305 B2
(45) Date of Patent: Jun. 24, 2008

(54) DRIVER WARNING DEVICE

(75) Inventors: Peter Knoll, Ettlingen (DE); Andreas Engelsberg, Hildesheim (DE); Dietrich Manstetten, Ehningen (DE); Holger Kussmann, Giesen (DE); Andre Kroehnert, Unterpoerlitz (DE); Lars Placke, Hannover (DE); Marc Stoerzel, Lippstadt (DE); Ulrich Schweiger, Stuttgart (DE); Stephan Eisenlauer, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 138 days.

(21) Appl. No.: 10/569,071

(22) PCT Filed: Aug. 19, 2004

(86) PCT No.: PCT/EP2004/051839
§ 371 (c)(1), (2), (4) Date: Feb. 16, 2006

(87) PCT Pub. No.: WO2005/023595
PCT Pub. Date: Mar. 17, 2005

(65) Prior Publication Data
US 2007/0013498 A1 Jan. 18, 2007

(30) Foreign Application Priority Data
Aug. 28, 2003 (DE) ............................ 103 39 647

(51) Int. Cl.
*B60Q 1/00* (2006.01)
*G08B 1/08* (2006.01)
*G08G 1/16* (2006.01)
*G06F 7/00* (2006.01)
*G06F 17/10* (2006.01)

(52) U.S. Cl. .................. 340/438; 340/435; 340/436; 340/441; 340/539.1; 340/903; 701/29; 701/45; 701/300; 701/301; 701/302

(58) Field of Classification Search ......... 340/435–439, 340/441, 539.1, 903; 701/29, 45, 300–302
See application file for complete search history.

(56) References Cited

U.S. PATENT DOCUMENTS

| | | | |
|---|---|---|---|
| 5,432,509 A * | 7/1995 | Kajiwara | 340/903 |
| 6,675,081 B2 * | 1/2004 | Shuman et al. | 701/48 |
| 6,696,929 B2 * | 2/2004 | Igaki et al. | 340/435 |
| 6,728,605 B2 * | 4/2004 | Lash et al. | 701/1 |
| 6,859,144 B2 * | 2/2005 | Newman et al. | 340/576 |
| 6,989,754 B2 * | 1/2006 | Kisacanin et al. | 340/576 |
| 7,039,551 B2 * | 5/2006 | Shu et al. | 702/182 |
| 7,124,027 B1 * | 10/2006 | Ernst et al. | 701/301 |
| 7,200,481 B2 * | 4/2007 | Yamamura et al. | 701/96 |
| 2003/0060950 A1 * | 3/2003 | McKeown et al. | 701/29 |

FOREIGN PATENT DOCUMENTS

| | | |
|---|---|---|
| DE | 38 22 119 | 1/1990 |
| DE | 42 11 556 | 10/1993 |
| DE | 199 52 854 | 8/2001 |
| DE | 100 39 795 | 3/2002 |
| EP | 0 443 644 | 8/1991 |
| JP | 2001124585 | 5/2001 |

* cited by examiner

*Primary Examiner*—George A Bugg
*Assistant Examiner*—Lam P Pham
(74) *Attorney, Agent, or Firm*—Kenyon & Kenyon LLP

(57) ABSTRACT

A driver warning device which serves to warn the driver when a safety-critical condition of the vehicle is reached. A warning is issued only if such issuance is to take place in accordance with a user profile. This avoids unnecessary warnings from being issued to a driver, which could reduce the acceptance of the warning system on the part of the driver.

21 Claims, 2 Drawing Sheets

DRIVER WARNING DEVICE

FIELD OF THE INVENTION

The present invention is directed to a driver warning device.

BACKGROUND INFORMATION

A method for warning a driver of a vehicle is described in German Patent Application No. DE 100 39 795 A1, where a critical situation is detected by vehicle sensors and the attentiveness of the driver is determined. A warning of the critical situation is issued as a function of the driver's attentiveness. This allows the driver to be warned in case of low attentiveness, whereas when he/she is highly attentive, he/she does not receive any warnings of dangers he/she has already perceived.

SUMMARY

A device in accordance with an example embodiment of the present invention may be advantageous in that a warning is issued to the driver only when a limit value for a safety-critical condition is exceeded, said limit value being determined as a function of a stored user profile. This gives the driver the possibility to himself/herself determine individual warning thresholds that are suitable for him/her and above which the he/she wants to receive a warning. This prevents a driver from receiving warnings he/she is not interested in, which could cause the driver to deactivate the entire warning device so that he/she would then no longer receive any warnings even if limit values are significantly exceeded and if he/she would have wanted to be warned thereof.

It is particularly advantageous if limit values for safety-critical conditions of the vehicle above which a warning should be issued are stored directly in the user profile. This allows the driver to directly influence the warnings issued. Thus, for example, the driver could make a setting to cause a lane departure warning to be issued only when the driver has crossed a lane boundary marking, or to cause a distance warning to be issued only when a distance from a vehicle ahead decreases by more than two meters below a safety distance equivalent to one-half the speedometer reading.

It is also particularly advantageous to provide an evaluation unit for determining a safety-critical limit value. The evaluation unit evaluates vehicle and/or driver conditions of a predetermined period of time, such as 10 minutes, prior to the time of evaluation, said conditions being stored in the user profile. If it is determined during this evaluation period that the limit value in question has already been exceeded several times, possibly in spite of a warning issued, then the limit value for a safety-critical condition above which a warning will be issued is increased such that no more warning is issued. For example, if a driver is driving in a particularly sporty manner, maintaining relatively small distances, or accelerating or decelerating hard, then at least some of the warnings, which would otherwise be issued, are now suppressed. Suppression is achieved by raising warning thresholds so as to issue a warning at a later time, i.e., when the speed is further increased, or when the distance is further reduced. In a preferred embodiment, the warnings can, in some cases, be issued only partially. Thus, for example, when crossing a lateral boundary line, when pulling up close, when accelerating hard, as well as when exceeding the maximum permissible speed, the issuance of an audible warning may be omitted in the event that sporty driving has been detected previously, whereas a visual warning is still displayed to the driver, especially on a display in the instrument cluster in front of the driver.

In addition, it is also possible to derive a driving behavior of the driver from the vehicle conditions recorded during a predetermined period of time prior to the time of evaluation, and to compare said driving behavior to a driving behavior stored in the user profile. This makes it possible to detect deviations of the driver's driving behavior from a driving behavior that is typical of him/her. If such deviations are present, it is possible to adapt the user profile only temporarily for the particular current trip. A permanent adaptation of the user profile is carried out only if a deviation from the previous user profile occurs during several consecutive trips.

Moreover, the attentiveness of the driver can be monitored using physiological parameters. For example, if the driver is found to be tired compared to his/her usual physical reactions, for example, if the driver exhibits a particularly high eyelid-blinking rate and/or a particularly low pulse rate, then the safety-critical limit values for the issuance of warnings are lowered in order to warn the user of dangers at the earliest possible point in time.

It is also advantageous to determine, in particular, the acceleration values, the RPM values and/or the distance values from vehicles ahead, and to analyze said values in a feedback unit in order to assess the driving behavior, and thus, to determine the limit values for safety-critical conditions. Especially the parameters mentioned allow a conclusion as to whether a driver is driving aggressively or defensively. Thus, it is also possible to draw a conclusion as to whether a driver is interested in warnings about slight exceeding of established limit values for safety-critical conditions, or whether he/she wants to receive a warning only when such a limit value is found to be significantly exceeded. In addition, the feedback unit can contain a control element with which the driver can deactivate a warning, thus directly communicating to the driver warning device that he/she regards the warning just issued as superfluous. Furthermore, the feedback unit may also be designed such that after a warning has been issued, it checks whether the driver has responded to the warning, so that the limit value for a safety-critical condition which has been found to be exceeded is no longer exceeded after a certain period of time. If the limit value continues to be exceeded, it may be assumed that this exceeding is deliberately desired by the driver. Thus, further warning of an exceeding of the limit value for the safety-critical condition may be entirely or partially omitted.

It is also advantageous to transfer a user profile to the driver warning device via an interface. In this manner, user-dependent profiles can, on the one hand, be conveniently set up also using an external control unit and especially be transferred also to a newly purchased or externally rented vehicle. The set-up can be done, for example, on a computer. Optionally, it may also be available to a driver in a preferably personalized smart card.

It is particularly advantageous to provide a control unit for selecting or setting up a new user profile so as to allow a user to individually adapt his/her user profile. Here, it is particularly advantageous to store different user profiles in a personalized manner for different drivers using a vehicle.

It is also advantageous to link the driver warning device via a data bus to a plurality of sensors in the vehicle for monitoring the vehicle and the driver. Data bus communication allows data to be transmitted to an arithmetic logic unit of the driver warning device in a reliable, fast and ease-to-analyze manner.

Moreover, it is advantageous to adapt the user profile as a function of the driver's reactions such that it may respond to changes in the driving style of the driver, and then to possibly no longer issue warnings to the driver, or to issue warnings to the driver only in a reduced manner for example, only visually.

BRIEF DESCRIPTION OF THE DRAWINGS

Exemplary embodiments of the present invention are shown in the figures and will be explained in greater detail in the description below.

DETAILED DESCRIPTION OF EXAMPLE EMBODIMENTS

The present invention may be used for any vehicle. In the following, the present invention will be explained with the example of a driver warning device for a motor vehicle.

Figure 1:
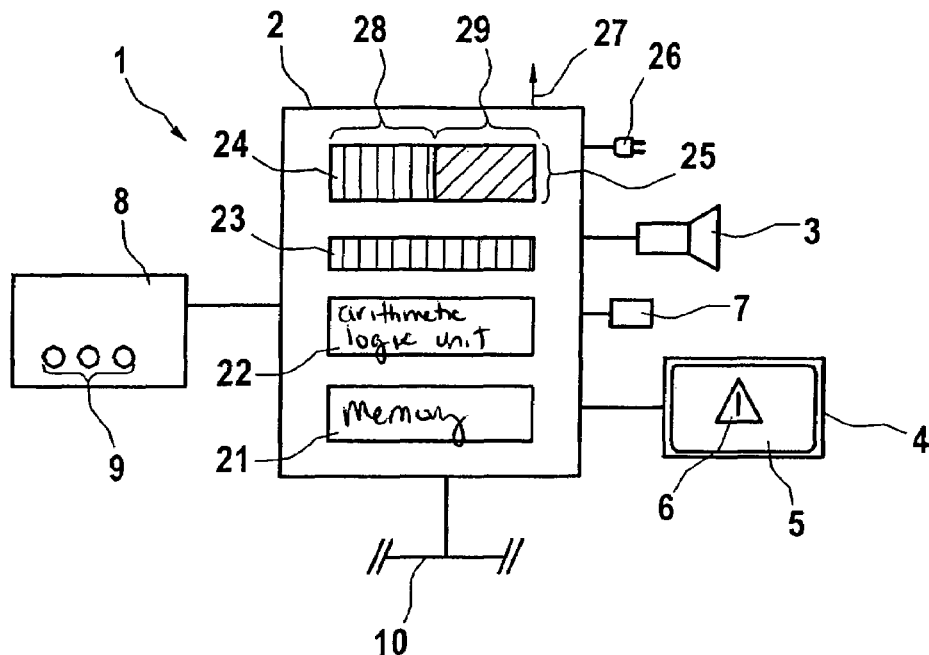
FIG. 1 depicts an exemplary embodiment of a driver warning device according to the present invention.

FIG. 1 shows a driver warning device 1 to which are connected a central processing unit 2, a loudspeaker 3, and a display 4. Beeps may be output via the speaker 3 to warn the driver. Display 4, which may be located, for example, in an instrument cluster or in a center console of the motor vehicle, has a display area 5, which is used, in particular, to display warning symbols 6 or warnings in the form of text. Moreover, a tactile warning element 7 can be connected to the central processing unit, said haptic warning element issuing a warning to the driver of the vehicle, for example, by motor-generated vibrations. To this end, it is possible, for example, to set the steering wheel or the driver's seat into vibrations so as to warn the driver of a possible danger. Central processing unit 2 is also connected to a control unit 8, which serves to control driving warning device 1. Control unit 8 is provided with suitable control elements 9 in the form of, for example, push-buttons or rotary buttons. Preferably, control unit 8 cooperates with display 4 in such a manner that a menu selection for controlling driver warning device 1 in display 4 can be controlled via control elements 9. Moreover, information from vehicle sensors which, in a preferred embodiment, monitor the driver and the vehicle, can be supplied to central processing unit 2 via a data bus 10. In further embodiments, it is also possible to monitor either only the driver or only the vehicle. In this context, "monitoring the vehicle" is understood to include not only the monitoring of parameters of the vehicle itself, such as engine parameters, speeds, acceleration and velocity, but also the monitoring of data related to the surroundings of the vehicle. This may include information which is provided by traffic signs or external service centers and relates to the condition of the road and, for example, to the maximum permissible speed. Moreover, in a preferred embodiment, this includes also the distance from adjacent vehicles or the detection of obstacles ahead of the vehicle.

Figure 2:
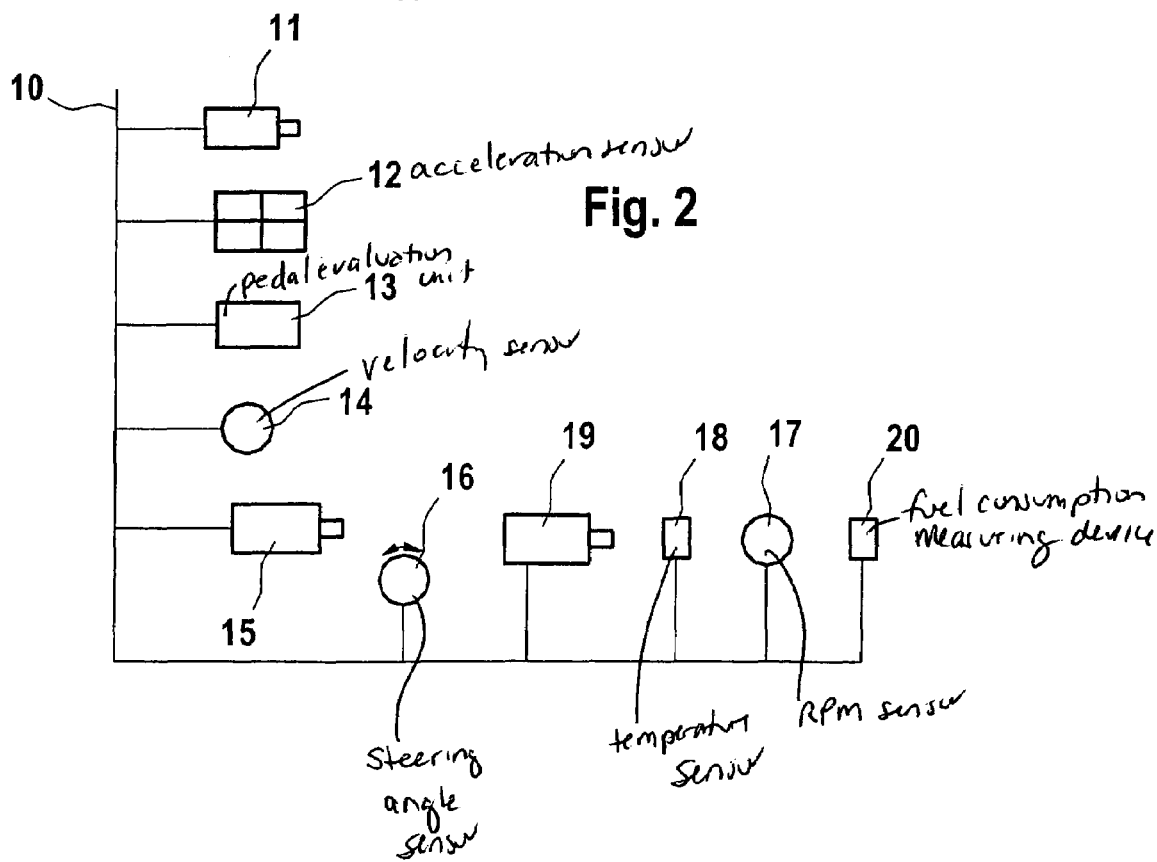
FIG. 2 shows sensors for determining vehicle and driver conditions, said sensors being connected to a data bus.

FIG. 2 shows the individual sensors whose data is supplied to central processing unit 2 via data bus 10. In a further embodiment, it is possible, especially if the parameters to be measured are highly dynamic, to replace data bus 10 with individual connections connecting the sensors or groups of sensors directly to central processing unit 2 without routing their data via the data bus. However, data bus 10 allows easy sampling of the various sensors.

The following is a description of a preferred configuration of sensors used for detecting vehicle and driver conditions. In this connection, it is not necessary for each of the sensors to be connected to data bus 10 for operation in accordance with the present invention. Accordingly, it is also possible to use only some of the sensors. Furthermore, additional sensors, which are not illustrated in FIG. 2, may also be connected to data bus 10.

A first camera 11 is provided to monitor the driver. In particular, the driver's blinking rate and/or viewing direction are monitored. If the system detects the closing of the eyes and/or an excessive blinking rate, then the driver's attentiveness is found to be low, possibly because the driver is tired. Also connected to data bus 10 are acceleration sensors 12 capable of measuring longitudinal acceleration, lateral acceleration, and/or angular acceleration. Optionally, it is also possible to evaluate the derivative of the acceleration, that is, the change in acceleration. If high acceleration values are detected, it may be assumed that the driver accelerates or decelerates very hard. If such high acceleration values are detected, it is probable that the driver pursues an aggressive driving style associated with high velocity changes. Also provided is a pedal evaluation unit 13, which measures the pressure on the accelerator pedal and a frequency of pedal application. If the system detects a high pressure on the accelerator pedal and/or frequently repeated pedal application, this also suggests a sporty driving style of the driver. A velocity sensor 14 is used for measuring the vehicle speed.

A distance sensor 15, especially in the form of a radar sensor, serves to determine the distance of the vehicle from a vehicle ahead. A steering angle sensor 16 is used to measure the steering angle and/or to measure the change in steering angle. Engine speed can be measured by an RPM sensor 17. A temperature sensor 18 is used for measuring the coolant temperature. A second camera 19 monitors the space ahead of the vehicle and detects when a lateral boundary of the lane is crossed. A fuel consumption measuring device 20 measures the amount of fuel currently consumed by the engine of the vehicle.

Some of these sensors serve to detect safety-critical conditions. First camera 11 is used to determine whether or not the driver is awake. Acceleration sensors 12 are used to determine whether or not permissible acceleration and rotation values are exceeded. The measurement of the velocity serves to monitor whether a maximum permissible speed is observed, provided that suitable speed information is provided to central processing unit 2, for example, via an air interface. The measurement of the distance serves to determine the distance from a vehicle ahead, said distance possibly representing a critical risk for the vehicle if it falls below a certain level. Correspondingly, the lane departure warning system detects departure from a lane of travel. The other vehicle and driver conditions, unless monitored for display purposes per se, are also monitored to ascertain the driver behavior and, possibly, for a plausibility check. For example, if frequent pedal applications and sharp steering angles occur while the vehicle is traveling at a relatively low speed, then the driver is probably not driving aggressively, but the vehicle is perhaps traveling on a mountainous road which requires frequent driver interventions without allowing the vehicle to reach high speeds.

Moreover, it is also possible to determine the number and intensity of braking maneuvers. To this end, it is possible to analyze, for example, whether the ABS system (anti-lock braking system) was required to actively intervene in the braking process. In this regard, it is also possible to analyze whether a traction control system or an electronic skid control system (ESP) was required to intervene in the driving behavior of the vehicle.

The parameters monitored by sensors 11, . . . , 20 via data bus 10 are transferred to a first memory 21 of central processing unit 2 where they are stored, possibly together with their time histories over a predetermined period of time, such as 15 minutes. In some instances, it is also possible to store only the currently measured value. Central processing unit 2 further includes an arithmetic logic unit 22 which compares the currently measured safety-relevant parameters to limit values stored in a second memory 23 of central processing unit 2. In a preferred embodiment, these limit values are input by the vehicle manufacturer. Arithmetic logic unit 22 compares the measured values stored in first memory 21 to the values stored in second memory 23. A user profile 25 stored in a third memory 24 is also included in the comparison. In a first exemplary embodiment, the limit values stored in second memory 23 and/or user profile 25 can be supplied to central processing unit 2 via a connector interface 26. Furthermore, it is also possible for central processing unit 2 to have an air interface 27 via which the respective data can be transferred to central processing unit 2. In a preferred embodiment, user profile 25 has a first area 28 in which are stored limit values for safety-critical conditions of the vehicle and/or driver. In a second area 29, there are stored driving conditions which characterize the driving behavior of the driver. The stored values include, for example, a limit value for the engine speed generally not exceeded by the driver. A value for a fuel consumption which, on average, is not exceeded over a period of, for example, 15 minutes, is stored as well. Also stored are limit values for a steering speed or a frequency of accelerator pedal application, which are generally not exceeded by the driver either. Safety-critical parameters that can be stored further include corresponding values that are generally met by the driver, such as a usual average speed, a usual average distance from a vehicle ahead and/or a maximum vehicle acceleration.

In a preferred embodiment, such a user profile 25 is stored for different drivers. When a driver starts a trip with the vehicle, he/she can identify himself/herself via control unit 8 so that the user profile 25 stored for him/her is taken into account. If a driver uses the vehicle for the first time, then there is preferably a standard user profile which has been set up earlier and which can be used by the new driver. The data in the user profile can also be manually input into central processing unit 2 via control elements 9 of control unit 8.

Figure 4:
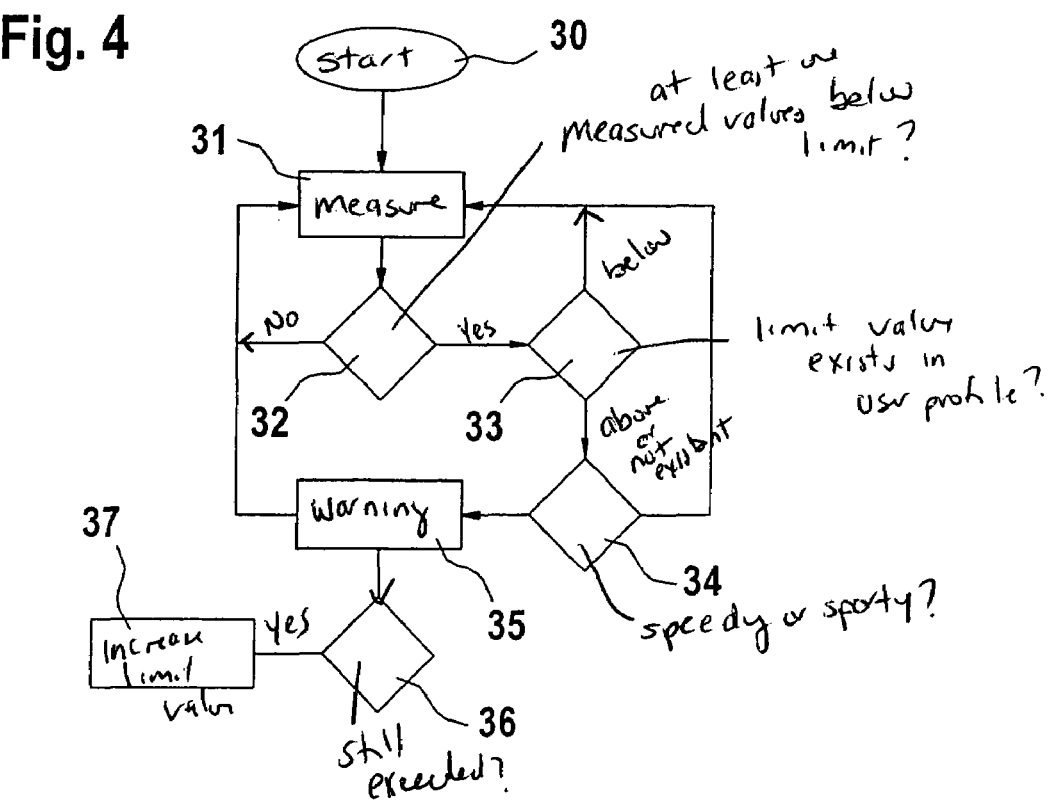
FIG. 4 shows an exemplary embodiment of a process sequence according to the present invention.

An example process sequence for operating the driver warning device according to an example embodiment of the present invention will now be explained with reference to FIG. 4. Beginning at a start step 30, such as the start of the vehicle, a branch is made to a measuring step 31. In measurement step 31, the sensors 11, . . . , 20 explained with reference to FIG. 2 measure the vehicle and driver parameters. The values measured are transferred to first memory 21 of central processing unit 2 via data bus 10. First measurement step 31 is followed by a first checking step 32 in which arithmetic logic unit 22 compares the measured values stored in first memory 21 to the limit values for safety-critical conditions stored in second memory 23. If all measured values are below a limit for a safety-critical condition, then a branch is made back to measurement step 31 and the measurement is continued. In this context, the term "below" is intended to mean that the measured values are within a range in which no warning should occur according to the limit values stored in second memory 23. For example, exceeding a speed limit of, for example, 50 km/h implies an exceeding of the limit value by a higher vehicle speed, whereas if the distance is too small, the limit value is only exceeded when the measured distance is smaller than the stored limit value. If the distance is greater, the measured value is within a range in which no warning is to be issued.

If first checking step 32 detects that at least one limit value is exceeded, then a branch is made to a second checking step 33. In second checking step 33, it is checked whether a limit value corresponding to the exceeded measured value exists in first area 28 of the user profile. If the measured value is above the limit value in second memory 23 but below the limit value in first area 28 of user profile 25, a branch is made back to measurement step 31 without issuing a warning. If the limit value determined is above the limit value specified in first area 28, or if no such limit value has been established, then a branch is made to a third checking step 34. In this case, a purely visual warning may optionally be issued in display 4 already before second checking step 33 or already before third checking step 34, possibly not in a central, but peripheral region of the display. In third checking step 34, it is checked whether the driver is found to be currently driving in a particularly speedy or sporty manner. To this end, a preferred embodiment determines the criteria of accelerator pedal contact, accelerator pedal pressure, fuel consumption, longitudinal acceleration, and of the crossing of lane marking lines. Limit values for each of these criteria are stored in second area 29 of the user profile. These limit values can be, for example, the following:

a rate of accelerator pedal contact, meaning the releasing and re-touching, of more than $1/10$ Hertz,
accelerator pedal fully depressed more than three times a minute,
an acceleration of more than 2 m/sec$^2$,
a fuel consumption of more than 10 liters per hundred kilometers during an average period of 10 minutes,
driving on or crossing a lane mark more than once per minute.

If at least two of these criteria are reached, then the driver is found to be driving in a sporty manner. For this case, an additional limit value is stored in second area 29 of user profile 25. If this limit value is not exceeded, then a branch is made back to measurement step 31 without issuing a warning. However, it this limit value is also exceeded, then a branch is made to a subsequent warning step 35 in which a warning is issued to the driver in a visual, audible and/or tactile manner. Subsequently, a branch is made back to measurement step 31 as well. Starting from warning step 35, after a predetermined period, it is checked in a fourth checking step 36 whether the exceeded measured value is still exceeded. If this is no longer the case, then the warning has been observed and there is no need to further issue a warning. However, if the limit value continues to be exceeded, then, in a correction step 37, the limit value in question is increased by a predetermined percentage, such as by 2%, or, in the case of decreasing limit values, such as a minimum distance, it is decreased accordingly. The user profile is thereby adapted so that warnings will be omitted in future. The adaptation performed is indicated in display 4 before the vehicle is turned off. If the driver confirms storage, the adaptation is stored for subsequent trips. If the user does not want to perform a storage operation, the values specified in the current user profile which was stored earlier will be available again beginning with the next trip.

Figure 3:
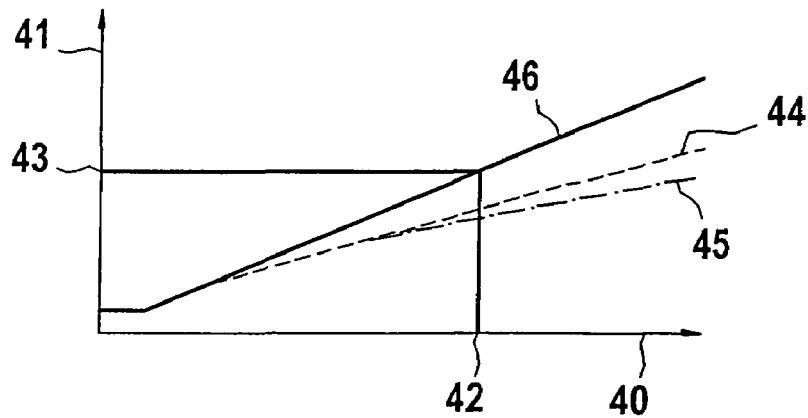
FIG. 3 shows an example of the determination of limit values for the safety-critical condition for a distance from a vehicle ahead.

FIG. 3 shows an example of limit values for a safety-critical condition with the example of a distance from a vehicle ahead. The vehicle speed is plotted on X-axis 40. Plotted on Y-axis 41 is the distance which, when it fails to be met, produces a warning about a vehicle ahead. From this, it becomes clear that the term "limit value" does not merely mean constant limits, but also curves which define the limit as a function of an additional parameter. FIG. 3, by way of example, features a point at which a warning is produced when, at a speed of 100 km/h, which is indicated by reference numeral 42, the distance falls below 53 meters, the value of 53 meters being indicated by reference numeral 43. Starting from this point toward the origin, a manufacturer-specified warning curve 46 below which a minimum distance to be maintained is no longer met is generally linear. Plotted below this curve is a first limit curve 44 which is driver-related and provides for a warning to be issued when, at a speed of 100 km/h (42), a minimum distance of 48 is no longer maintained. If a comparison of the vehicle conditions with the limit values stored in second area 29 of the user profile establishes that the driver is driving in a sporty and/or speedy manner, which is generally associated with a high degree of attentiveness, then a warning is issued only when the distance falls below second limit curve 45. For example, at a speed of 100 km/h this would be a warning issued only when the distance from the vehicle ahead falls below 45 meters. A further embodiment may also provide for distances of 50, 40, and 35 meters for warning curve 46, first limit curve 44, and second limit curve 45, respectively, as the corresponding distance limits at a speed of 100 km/h.

The limit values in second memory 23 can also be overwritten by the limit values in first area 28 of the user profile. This also allows a user to specify limit values for himself/herself, causing a warning to be issued earlier than intended by the vehicle manufacturer. Because of this, the issuance of warnings can also be adapted to new legal provisions. In particular, an especially prudent driver is also able to modify the configuration such that he/she is warned at a very early point in time. For example, a driver could specify a distance curve such that at a speed of 100 km/h, a warning is already issued when the distance from a vehicle ahead is 60 meters.

Corresponding limit values can be specified not only for vehicles parameters but also for driver-related parameters, such as a blinking rate. This allows, for example, for driver drowsiness detection.

What is claimed is:

1. A driver warning device comprising:
    a detection unit for detecting conditions of at least one of:
       i) a vehicle, and ii) a driver of the vehicle; and
    a warning unit for issuing warnings to the driver when a safety-critical condition of the at least one of the vehicle and the driver is reached, a limit value for a safety-critical condition of the at least one of the vehicle and the driver being determined as a function of a user profile which contains data collected during a previous driving trip;
    wherein the warning unit reduces a degree of warning when it is recognized that the driver is intentionally driving in a manner that triggers the safety-critical condition.

2. The device as recited in claim 1, wherein limit values for safety-critical conditions of the at least one of the vehicle and the driver are stored in the user profile.

3. The device as recited in claim 1, further comprising:
    an evaluation unit configured to determine a safety-critical limit value by comparing at least one of vehicle and driver conditions stored in the user profile to at least one of vehicle and driver conditions recorded during a predetermined period of time prior to a time of evaluation.

4. The device as recited in claim 3, further comprising:
    a unit configured to change an associated safety-control limit if at least one of acceleration values and RPM values is above a predetermined limit.

5. The device as recited in claim 3, further comprising:
    a unit which changes an associated safety-control limit if a distance from vehicles ahead are below a predetermined limit.

6. The device as recited in claim 1, further comprising:
    a feedback unit configured to determine a driver reaction to a warning and to adapt the user profile as a function of whether there was a reaction to the warning.

7. The device as recited in claim 1, further comprising:
    an interface configured to supply the user profile to the device.

8. The device as recited in claim 1, further comprising:
    a control unit configured to select a stored user profile.

9. The device as recited in claim 1, further comprising:
    a control unit configured to set up a new user profile.

10. The device as recited in claim 1, further comprising:
    a memory unit to store user profiles for different drivers of the vehicle.

11. The device as recited in claim 1, wherein the device is connected via a data bus to a plurality of sensors to detect conditions of the at least one of the vehicle and the driver.

12. A driver warning method, comprising:
    detecting conditions of at least one of a vehicle and driver of the vehicle;
    issuing a warning to the driver when a safety-critical condition of the at least one of the vehicle and the driver is reached;
    determining a limit value for the safety-critical condition as a function of a stored user profile which contains data collected during a previous driving trip;
    recognizing that the driver is intentionally driving in a manner that triggers the safety-critical condition; and
    reducing a degree of warning after the intentional driving is recognized.

13. The method as recited in claim 12, further comprising:
    adapting the user profile as a function of at least one of vehicle conditions, driver conditions, and a driver input.

14. The method as recited in claim 12, wherein the adapting includes deactivating warnings.

15. The method as recited in claim 12, further comprising:
    recognizing that the safety-critical limit value deviates from past safety-critical values;
    identifying similar deviations that have occurred during past driving trips; and
    after the identification of similar deviations, modifying the user profile to correspond to the deviating safety-critical limit value.

16. The method as recited in claim 12, wherein the recognition of intentional driving results from a simultaneous occurrence of a plurality of safety-critical conditions.

17. The method as recited in claim 12, wherein the reduction occurs only after the driver has repeatedly ignored previous warnings.

18. The device as recited in claim 3, wherein the predetermined time period corresponds to the previous driving trip.

19. The device as recited in claim 3, wherein the evaluation unit modifies the user profile to correspond to a safety-critical limit value that deviates from past safety-critical limit values contained in the user profile, the modification occurring after the evaluation unit identifies similar deviations that have occurred during past driving trips.

20. The device as recited in claim 1, wherein the recognition of intentional driving results from a simultaneous occurrence of a plurality of safety-critical conditions.

21. A driver warning device comprising:
    a detection unit for detecting conditions of at least one of:
       i) a vehicle, and ii) a driver of the vehicle;
    a warning unit for issuing warnings to the driver when a safety-critical condition of the at least one of the vehicle and the driver is reached, a limit value for a safety-critical condition of the at least one of the vehicle and the driver being determined as a function of a user profile; and
    a feedback unit configured to determine a driver reaction to a warning and to adapt the user profile as a function of whether there was a reaction to the warning.

* * * * *